(12) United States Patent
Kim et al.

(10) Patent No.: US 11,904,769 B2
(45) Date of Patent: Feb. 20, 2024

(54) SYSTEM AND METHOD FOR GENERATING VIRTUAL ENGINE SOUND OF VEHICLE

(71) Applicants: HYUNDAI MOTOR COMPANY, Seoul (KR); Kia Corporation, Seoul (KR)

(72) Inventors: Ki Chang Kim, Suwon-si (KR); Dong Chul Park, Anyang-si (KR); Eun Soo Jo, Hwaseong-si (KR); Jin Sung Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 280 days.

(21) Appl. No.: 17/407,546

(22) Filed: Aug. 20, 2021

(65) Prior Publication Data

US 2022/0355732 A1    Nov. 10, 2022

(30) Foreign Application Priority Data

May 4, 2021    (KR) .................. 10-2021-0057979

(51) Int. Cl.
*B60Q 5/00*    (2006.01)
*B60W 50/10*    (2012.01)
(Continued)

(52) U.S. Cl.
CPC ............ *B60Q 5/001* (2013.01); *B60W 40/08* (2013.01); *B60W 50/10* (2013.01); *B60W 50/14* (2013.01);
(Continued)

(58) Field of Classification Search
CPC .. G10K 15/02; G10K 15/04; G10K 11/17873; G10K 2210/1282; G10K 9/20; G10K 1/074; G10K 11/002; G10K 11/17821; G10K 11/17823; G10K 11/1783; G10K 11/1785; G10K 11/343;
(Continued)

(56) References Cited

U.S. PATENT DOCUMENTS 10,133,540 B2    11/2018    Kwon
10,960,816 B2    3/2021    Lee et al.
(Continued)

FOREIGN PATENT DOCUMENTS

EP    3 166 103 A1    5/2017
KR    10-1744716 B1    6/2017
(Continued)

*Primary Examiner* — Lun-See Lao
*Assistant Examiner* — Lunsee Lao
(74) *Attorney, Agent, or Firm* — MORGAN, LEWIS & BOCKIUS LLP

(57) ABSTRACT

A system for generating a virtual engine sound may include a server having information on at least one review of the virtual engine sound, and a virtual engine sound generator to generate "my sound" by tuning the virtual engine sound based on information on customized design settings, to update a preset driver emotion model for each emotion evaluation area of the virtual engine sound, based on the information on the at least one review of the virtual engine sound, which is received from the server, and to update the virtual engine sound based on the "my sound" and the driver emotion model updated for each emotion evaluation area.

18 Claims, 9 Drawing Sheets

(51) Int. Cl.
  *B60W 50/14* (2020.01)
  *B60W 40/08* (2012.01)
  *G10K 15/02* (2006.01)

(52) U.S. Cl.
  CPC ....... *G10K 15/02* (2013.01); *B60W 2050/146* (2013.01); *B60W 2540/10* (2013.01); *B60W 2540/22* (2013.01); *B60Y 2306/11* (2013.01)

(58) Field of Classification Search
  CPC . G10K 2210/1082; G10K 2210/12821; G10K 2210/3014; G10K 2210/3044; G10K 9/10; G10K 9/13; G10K 9/22; H04R 2499/13; H04R 1/22; H04R 9/06; H04R 1/025; H04R 3/00; H04R 5/02; H04R 7/04; H04R 9/025; H04R 9/046; H04R 1/028; H04R 1/2803; H04R 3/04; H04R 5/04; H04R 7/16; H04R 1/026; H04R 2400/03; H04R 2430/01; H04R 29/001; H04R 3/08; H04R 7/20; H04R 9/02; H04R 9/041; H04R 9/043; H04R 9/066; H04R 9/18; H04R 1/02; H04R 2420/01; H04R 3/005

USPC ..................................................... 381/61, 86
  See application file for complete search history.

(56) References Cited

U.S. PATENT DOCUMENTS

| | | | |
|---|---|---|---|
| 2007/0269054 A1* | 11/2007 | Takagi | A63F 13/57 |
| | | | 381/71.4 |
| 2011/0085674 A1* | 4/2011 | Fujikawa | G10K 15/02 |
| | | | 381/86 |
| 2015/0353007 A1* | 12/2015 | Inoue | G10K 15/02 |
| | | | 903/902 |
| 2017/0123754 A1* | 5/2017 | Kwon | G06F 3/165 |
| 2019/0111839 A1* | 4/2019 | Lee | B60K 35/00 |
| 2020/0324697 A1* | 10/2020 | Lee | B60W 40/08 |
| 2021/0001770 A1* | 1/2021 | Kim | G10K 11/343 |

FOREIGN PATENT DOCUMENTS

| | | |
|---|---|---|
| KR | 10-1856935 B1 | 5/2018 |
| KR | 10-2131390 B1 | 7/2020 |
| KR | 10-2020-0123503 A | 10/2020 |

\* cited by examiner

SYSTEM AND METHOD FOR GENERATING VIRTUAL ENGINE SOUND OF VEHICLE

CROSS-REFERENCE TO RELATED APPLICATION

The present application claims priority to Korean Patent Application No. 10-2021-0057979, filed on May 4, 2021, the entire contents of which is incorporated herein for all purposes by this reference.

BACKGROUND OF THE INVENTION

Field of the Invention

The present invention relates to a system and a method for generating a virtual engine sound of a vehicle.

Description of Related Art

Since an electric vehicle using electricity does not generate engine noise when traveling, the electric vehicle is disposed with an electronic sound generator (ESG) to reproduce a virtual engine sound such that the virtual engine sound appropriate to a driving situation of the vehicle is generated.

However, the ESG has a limitation in being customized for a user or reflecting the latest trend, because of generating a mere monotonous virtual engine sound. Accordingly, there is needed to develop a technology of generating a virtual engine sound customized for the user and reflecting the latest trend.

The information disclosed in this Background of the Invention section is only for enhancement of understanding of the background of the invention and may not be taken as an acknowledgement or any form of suggestion that this information forms the prior art already known to a person skilled in the art.

BRIEF SUMMARY

Various aspects of the present invention are directed to providing a system and a method for generating a virtual engine sound of a vehicle, which is customized for a vehicle user and has the latest trend reflected through a user review.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains.

According to various aspects of the present invention, a system for generating a virtual engine sound of a vehicle may include a server having information on at least one review of the virtual engine sound, and a virtual engine sound generator to generate "my sound" by tuning the virtual engine sound based on information on customized design settings, to update a preset driver emotion model for each emotion evaluation area of the virtual engine sound, based on the information on the at least one review of the virtual engine sound, which is received from the server, and to update the virtual engine sound based on the "my sound" and the driver emotion model updated for each emotion evaluation area.

The virtual engine sound generator may generate the information on the customized design settings based on a mode, a sound volume, and a tone of the virtual engine sound, and a reaction degree resulting from the depressing of an accelerator pedal of the vehicle.

The virtual engine sound generator may further include an interface to output an image for adjusting the mode, the sound volume, and the tone of the virtual engine sound, and the reaction degree resulting from the depressing of the accelerator pedal.

The emotion evaluation area may include at least one of "Idle Volume", "Engine Main", "Dynamics", "Rumble", or "Whine".

The virtual engine sound generator may set the driver emotion model for each emotion evaluation area, based on at least one of the speed of the vehicle, the RPM of the vehicle, the opening amount of an accelerator pedal of the vehicle, or an acceleration of the vehicle.

The virtual engine sound generator may extract a keyword from the review information and may update the preset driver emotion model for each emotion evaluation area of the virtual engine sound, based on the extracted keyword.

According to various aspects of the present invention, a method for generating a virtual engine sound of a vehicle may include generating "my sound" by tuning a virtual engine sound based on information on customized design settings, updating a preset driver emotion model for each emotion evaluation area of the virtual engine sound, based on information on at least one review of the virtual engine sound, and updating the virtual engine sound based on the "my sound" and the driver emotion model updated for each emotion evaluation area.

The generating of the "my sound" may include generating information on the customized design settings based on at least one setting value for a mode, a sound volume, and a tone of the virtual engine sound, or a reaction degree resulting from the depressing of an accelerator pedal of the vehicle.

The generating of the "my sound" may include tuning the virtual engine sound by adjusting the mode of the virtual engine sound, the sound volume of the virtual engine sound, the tone of the virtual engine sound, and a reaction degree of an accelerator pedal through the interface.

The emotion evaluation area may include at least one of "Idle Volume", "Engine Main", "Dynamics", "Rumble", or "Whine".

The updating of the driver emotion model may include setting the driver emotion model for each emotion evaluation area, based on at least one of the speed of the vehicle, the RPM of the vehicle, the opening amount of an accelerator pedal of the vehicle, or an acceleration of the vehicle.

The updating of the driver emotion model may include extracting a keyword from the review information and updating the preset driver emotion model for each emotion evaluation area of the virtual engine sound, based on the extracted keyword.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
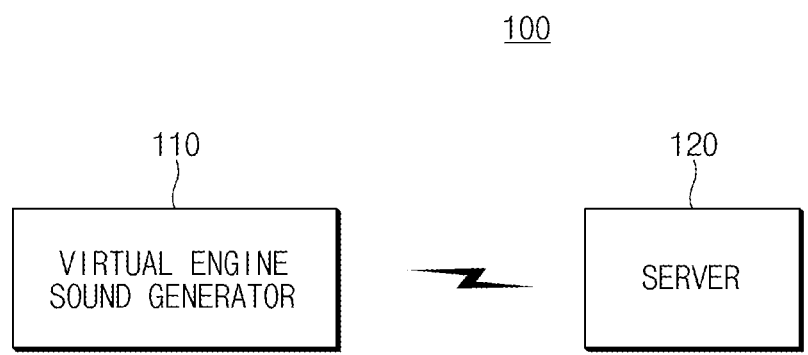
FIG. 1 is a block diagram illustrating the configuration of a system for generating a virtual engine sound of a vehicle, according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

Furthermore, in the following description of components according to various exemplary embodiments of the present invention, the terms 'first', 'second', 'A', 'B', '(a)', and '(b)' may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating the configuration of a system for generating a virtual engine sound of a vehicle, according to various exemplary embodiments of the present invention.

As illustrated in FIG. 1, a system 100 for generating a virtual engine sound for a vehicle according to various exemplary embodiments of the present invention may include a virtual engine sound generator 110 and a server 120.

The virtual engine sound generator 110 may generate "my sound" by tuning a virtual engine sound, based on information on customized design settings, may update a preset driver emotion model for each emotion evaluation area of the virtual engine sound, based on information on at least one review of the virtual engine sound, which is received from the server 120, and may update the virtual engine sound based on the "my sound" and the driver emotion model updated for each emotion evaluation area. The details thereof will be made with reference to FIG. 2.

The server 120 may make wireless communication with the virtual engine sound generator 110 to generate the information on the review of the virtual engine sound generated by at least one virtual engine sound generator 110, and may store the information on the review. Furthermore, the server 120 may transmit the information on the review of the virtual engine sound to the virtual engine sound generator 110.

Figure 2:
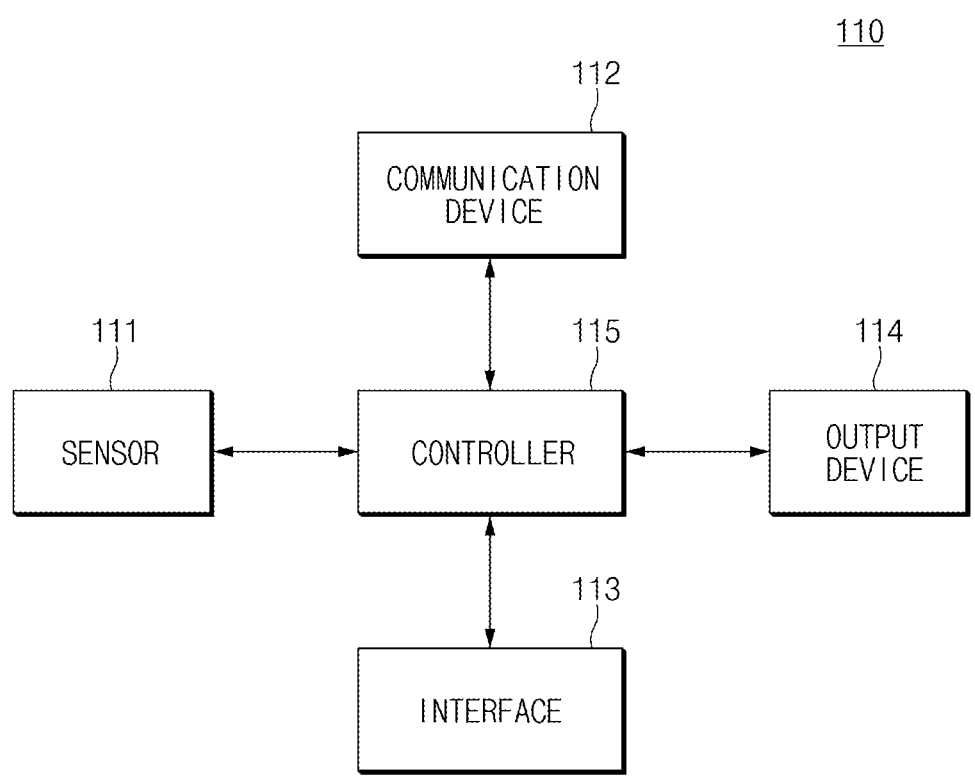
FIG. 2 is a view exemplarily illustrating the configuration of a virtual engine sound generator, according to various exemplary embodiments of the present invention.

FIG. 2 is a view exemplarily illustrating the configuration of a virtual engine sound generator, according to various exemplary embodiments of the present invention.

As illustrated in FIG. 2, the virtual engine sound generator 110 may include a sensor 111, a communication device 112, an interface 113, an output device 114, and a controller 115.

The sensor 111 may obtain traveling information of the vehicle. According to various exemplary embodiments of the present invention, the sensor 111 may include a speed sensor, an engine rotation speed sensor, a yaw sensor, and an accelerator pedal sensor, and may obtain information on the speed of the vehicle, the engine rotation speed of the vehicle, the yaw rate of the vehicle, and the degree of depressing the accelerator pedal.

The communication device 112 may make wireless communication with the server 120. The communication device 112 may make wireless communication with the server 120 through various wireless communication schemes including WiFi, Wibro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), and Long Term Evolution (LET).

The interface 113 may output an image to adjust a mode, a sound volume, and a tone of the virtual engine sound, and a reaction degree resulting from the depressing of an accelerator pedal of the vehicle. The controller 115 may generate information on customized design settings based on at least one setting value of the mode, the sound volume, or the tone of the virtual engine sound, or the reaction degree resulting from the depressing of the accelerator pedal. According to various exemplary embodiments of the present invention, the interface 113 may be implemented in a form of one of a touch screen and a touch pad.

The output device 114 may output the virtual engine sound from the controller 115. The output device 114 may be implemented with at least one speaker provided inside the vehicle.

The controller 115 may be implemented with various processing devices, such as a microprocessor having a semiconductor chip embedded in the microprocessor, to operate or execute various instructions, and may control the overall operation of the virtual engine sound generator 110, according to various exemplary embodiments of the present invention.

The controller 115 may generate the "my sound" by tuning the virtual engine sound selected based on the information on the customized design settings, when the virtual engine sound is selected by a driver. According to various exemplary embodiments of the present invention, the controller 115 may control the interface 113 to output an image for adjusting the mode, a sound volume, and the tone of a virtual engine sound, and the reaction degree resulting from the depressing of the accelerator pedal, and may generate information on the customized design settings based on the mode, the sound volume, and the tone of the virtual engine sound, and the reaction degree resulting from the depressing of the accelerator pedal, which are set by the driver. The details thereof will be made with reference to FIG. 3A to FIG. 3D.

FIG. 3A, FIG. 3B, FIG. 3C, and FIG. 3D are views exemplarily illustrating an interface for designing "my sound", according to various exemplary embodiments of the present invention.

Figure 3A:
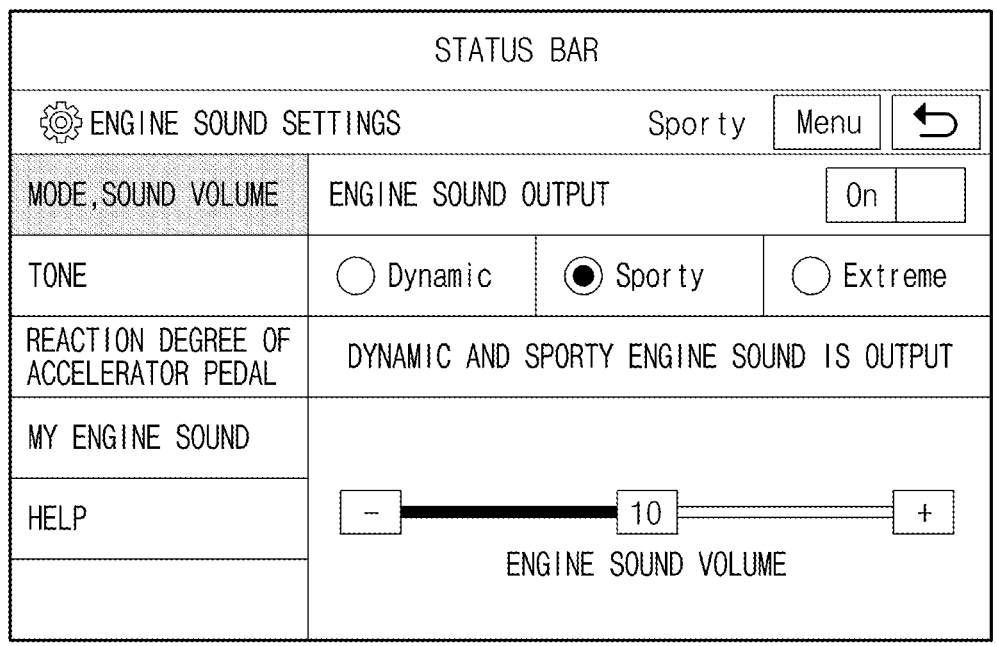
FIG. 3A, FIG. 3B, FIG. 3C, and FIG. 3D are views exemplarily illustrating an interface for designing "my sound", according to various exemplary embodiments of the present invention.

As illustrated in FIG. 3A, the interface 113 may output an image for selecting the mode of the virtual engine sound and an image for adjusting the sound volume of the virtual engine sound. According to various exemplary embodiments of the present invention, the interface 113 may output an image for selecting any one of a dynamic mode, a sporty mode, and an extreme mode, for the mode of the virtual engine sound.

Figure 3B:
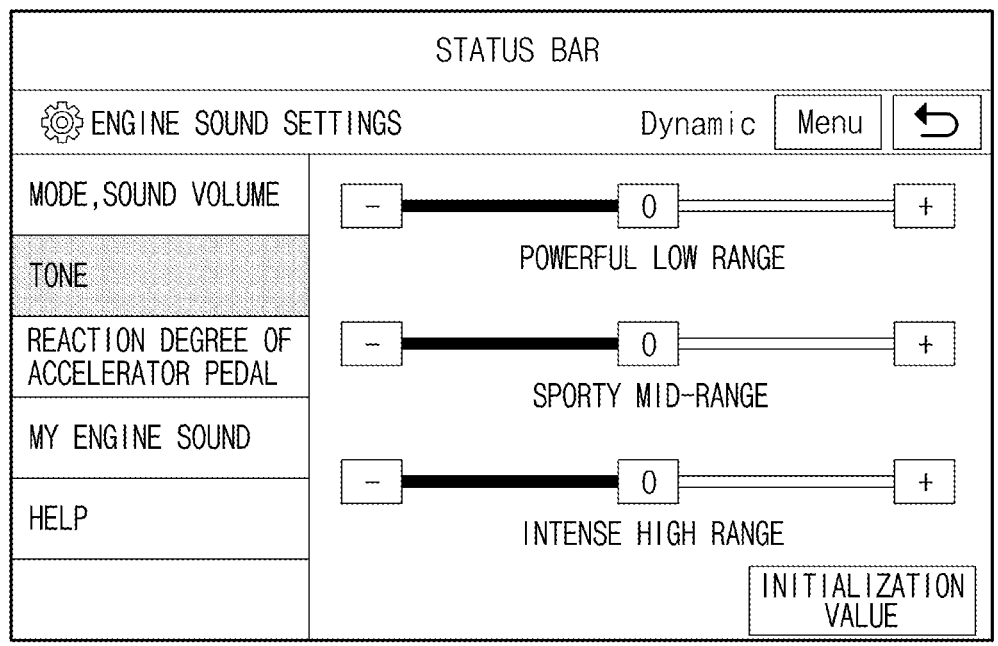

As illustrated in FIG. 3B, the interface 113 may output an image for adjusting the tone of the virtual engine sound. According to various exemplary embodiments of the present invention, the interface 113 may output an image for selecting any one of a powerful low range, a sporty mid-range, and an intense high range, for the tone of the virtual engine sound.

Figure 3C:
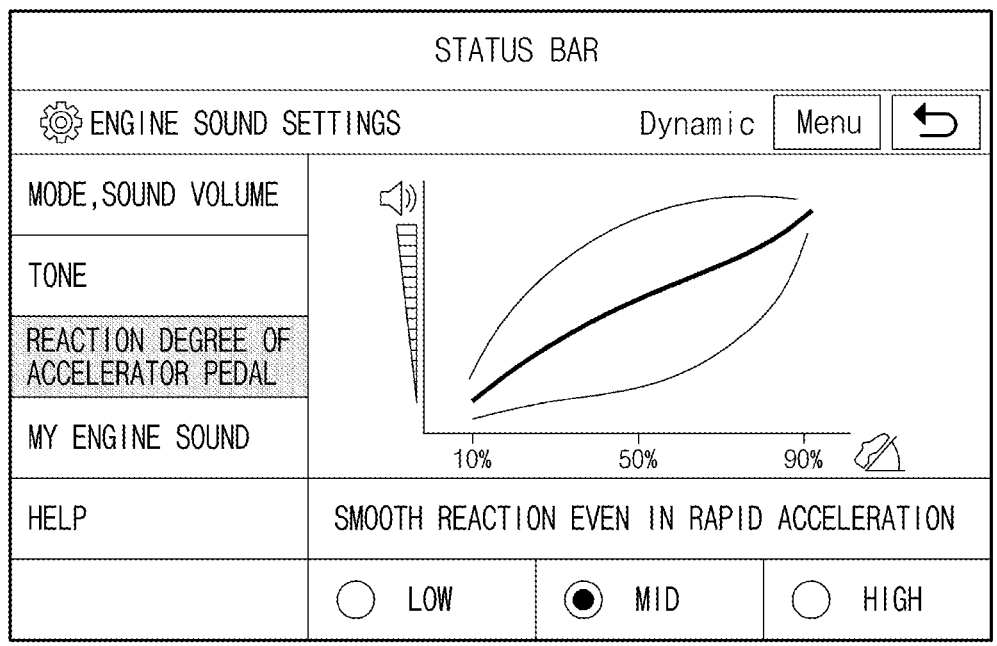

As illustrated in FIG. 3C, the interface 113 may output an image for adjusting the reaction degree of the accelerator pedal. According to various exemplary embodiments of the present invention, the interface 113 may output an image for selecting any one of a lower level, a mid-level, and a higher level, for the reaction degree of the accelerator pedal.

According to various exemplary embodiments of the present invention, the controller 115 may generate the information on the customized design settings, based on information set through the images of the interfaces 113 illustrated in FIG. 3A, FIG. 3B and FIG. 3C, but the present invention is not limited thereto. For example, the information on the customized design settings may be generated through the image of the interface 113 of FIG. 3D obtained by integrating the images of the interfaces 113 of FIG. 3A, FIG. 3B and FIG. 3C into one image.

Figure 3D:
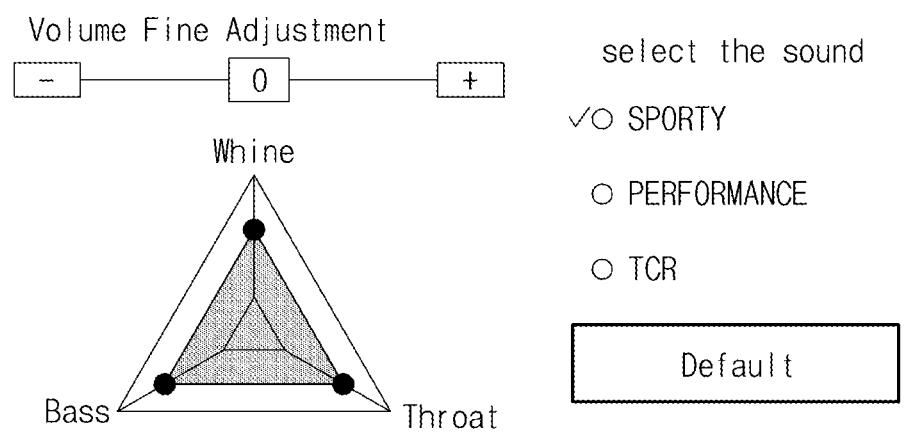

As illustrated in FIG. 3D, the interface 113 may output an image for adjusting a sound volume of the virtual engine sound, an image for selecting a mode of the virtual engine sound, and an image for adjusting the range (Bass, Whine, Throat) of the virtual engine sound, and may generate the information on the customized design settings, based on information set by the driver.

The controller 115 may generate the virtual engine sound allowing the driver to feel a natural acceleration sensation depending on revolutions per minute (RPM) of the vehicle, when the virtual engine sound is set to the sporty mode in default. According to various exemplary embodiments of the present invention, the controller 115 may output a sound differentiated depending on the RPM of the vehicle, when generating the "my sound", based on the speed of the vehicle and the opening amount of the accelerator pedal, or when generating the "my sound" based on a global positioning system (GPS) speed of the vehicle. According to various exemplary embodiments of the present invention, the controller 115 may differentiate a virtual engine sound at a lower RPM of 2500 RPM or less from a virtual engine sound at a higher RPM exceeding 4500 RPM.

The controller 115 may classify the virtual engine sound, based on at least one emotion evaluation area. The details thereof will be made with reference to FIG. 4.

Figure 4:
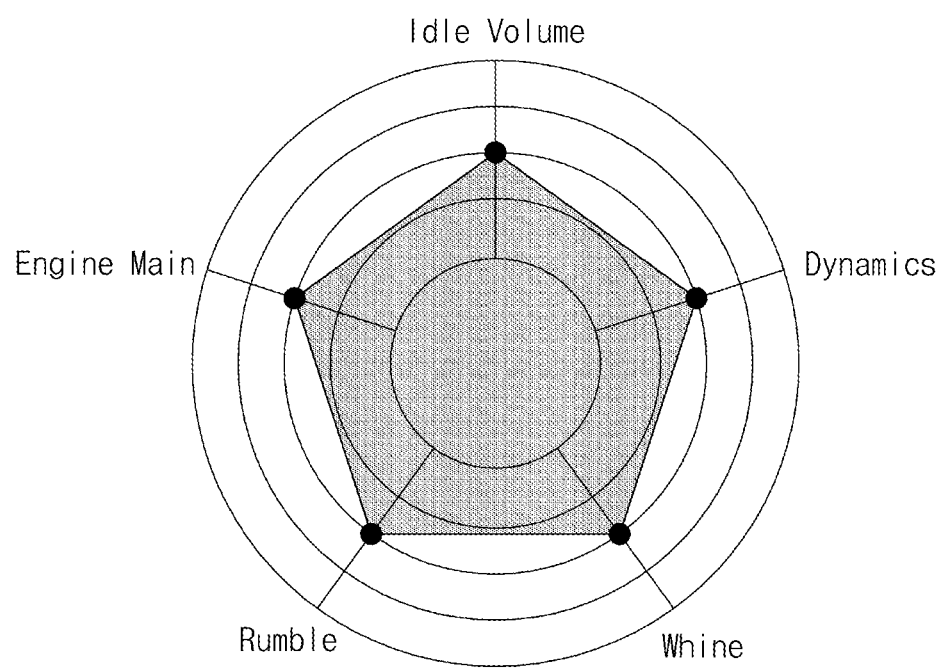
FIG. 4 is a view schematically illustrating an emotion evaluation area, according to various exemplary embodiments of the present invention.

FIG. 4 is a view schematically illustrating an emotion evaluation area, according to various exemplary embodiments of the present invention.

According to various exemplary embodiments of the present invention, the emotion evaluation area may include "Idle Volume", "Engine Main", "Dynamics", "Rumble", and "Whine". The "Idle Volume" may include a sound of a vehicle stopped, the "Engine Main" may include a sound of a vehicle traveling at a constant speed, "Dynamics" may include a sound of a vehicle accelerated, the "Rumble" may include a sound of a vehicle traveling at a higher speed, and the "Whine" may include a sound of a vehicle in gear shifting.

The controller 115 may set a driver emotion model for each emotion evaluation area. The controller 115 may set the driver emotion model for each emotion evaluation area, based on at least one of the speed of the vehicle, the RPM of the vehicle, the opening amount of an accelerator pedal of the vehicle, or an acceleration of the vehicle.

According to various exemplary embodiments of the present invention, the controller 115 may set the driver emotion model by performing a pitch control operation, a gain control operation, an APS control operation with respect to the driver emotion model for each emotion evaluation area, based on at least one of the speed of the vehicle, the RPM of the vehicle, the opening amount of the accelerator pedal, or the acceleration. The pitch control operation may refer to adjusting a tone of the virtual engine sound to be higher or lower by tuning a pitch rate and a grain level of the virtual engine sound, depending on the RPM of the vehicle engine. The gain control operation may refer to adjusting the change in a timbre and the resistance of the virtual engine sound. The APS control operation may refer to adjusting the virtual engine sound depending on the constant speed traveling or acceleration traveling of the vehicle based on the opening amount of the accelerator pedal.

Furthermore, the controller 115 may set the driver emotion model by filtering the frequency of the virtual engine sound to adjust a reproduced frequency band, performing the volume control, or adjusting the virtual engine sound through a shepard layer control operation. The controller 115 may set the driver emotion model for each emotion evaluation area to "WAV" and may store the driver emotion model.

The controller 115 may receive information on at least one review of the virtual engine sound, from the server 120, and may update the driver emotion model for each emotion evaluation area based on the received information on at least one review of the virtual engine sound.

According to various exemplary embodiments of the present invention, the controller 115 may extract a keyword from the review information and may update the preset driver emotion model for each emotion evaluation area of the virtual engine sound, based on the extracted keyword. For example, the controller 115 may update the preset driver emotion model by updating a setting value for at least one of the pitch control operation, the gain control operation, the APS control operation, the frequency filtering operation, the volume control operation, or the shepard layer control operation in the preset driver emotion model for each emotion evaluation area, based on the extracted keyword.

The controller 115 may update the virtual engine sound, based on the "my sound" and the updated driver emotion model.

Accordingly, the controller 115 may update the virtual engine sound, based on the driver emotion model updated for the "my sound" and the review information, providing the virtual engine sound having the latest trend reflected based on the review information, when compared with the virtual engine sound before updating the driver emotion model in the same emotion evaluation area.

Figure 5:
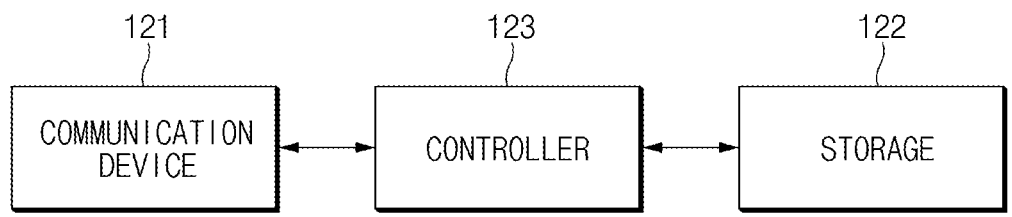
FIG. 5 is a view exemplarily illustrating the configuration of a server, according to various exemplary embodiments of the present invention.

FIG. 5 is a view exemplarily illustrating the configuration of a server, according to various exemplary embodiments of the present invention.

As illustrated in FIG. 5, according to various exemplary embodiments of the present invention, the server 120 may include a communication device 121, a storage 122, and a controller 123.

The communication device 121 may make wireless communication with the virtual engine sound generator 110. The communication device 121 may make wireless communication with the virtual engine sound generator 110 through various wireless communication schemes including WiFi, Wibro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), and Long Term Evolution (LET).

The storage 122 may store at least one algorithm to execute the computation of various instructions for the operation of the server 120, according to various exemplary embodiments of the present invention. The storage 10 may include at least one storage medium of a flash memory, a hard disc, a memory card, a Read Only Memory (ROM), a Random Access Memory (RAM), an Electrically Erasable and Programmable ROM (EEPROM), a Programmable ROM (PROM), a magnetic memory, a magnetic disc, or an optical disc.

The controller 123 may be implemented with various processing devices, such as a microprocessor having a semiconductor chip embedded in the microprocessor, to operate or execute various instructions, and may control the overall operation of the server 120, according to various exemplary embodiments of the present invention.

According to various exemplary embodiments of the present invention, the controller 123 may perform a control operation to store the information on the review of at least one virtual engine sound generated from at least one virtual engine sound generator 110. Furthermore, at least one virtual engine sound generated from at least one virtual engine sound generator 110 may include a virtual engine sound selected by the driver, and may include a virtual engine sound updated based on "my sound", which is generated through operation of the virtual engine sound generator 110 in various exemplary embodiments of the present invention, and a virtual engine sound updated based on the driver emotion model updated for each emotion evaluation area. Furthermore, the review information may include at least one of at least one review image, which is photographed by a user (reviewer) in association with the updated virtual engine sound, and at least one review message made by the user (reviewer). The controller 123 may generate a database by storing information on at least one review of the virtual engine sound.

The controller 123 may transmit the information on the at least one review to the virtual engine sound generator 110.

Figure 6:
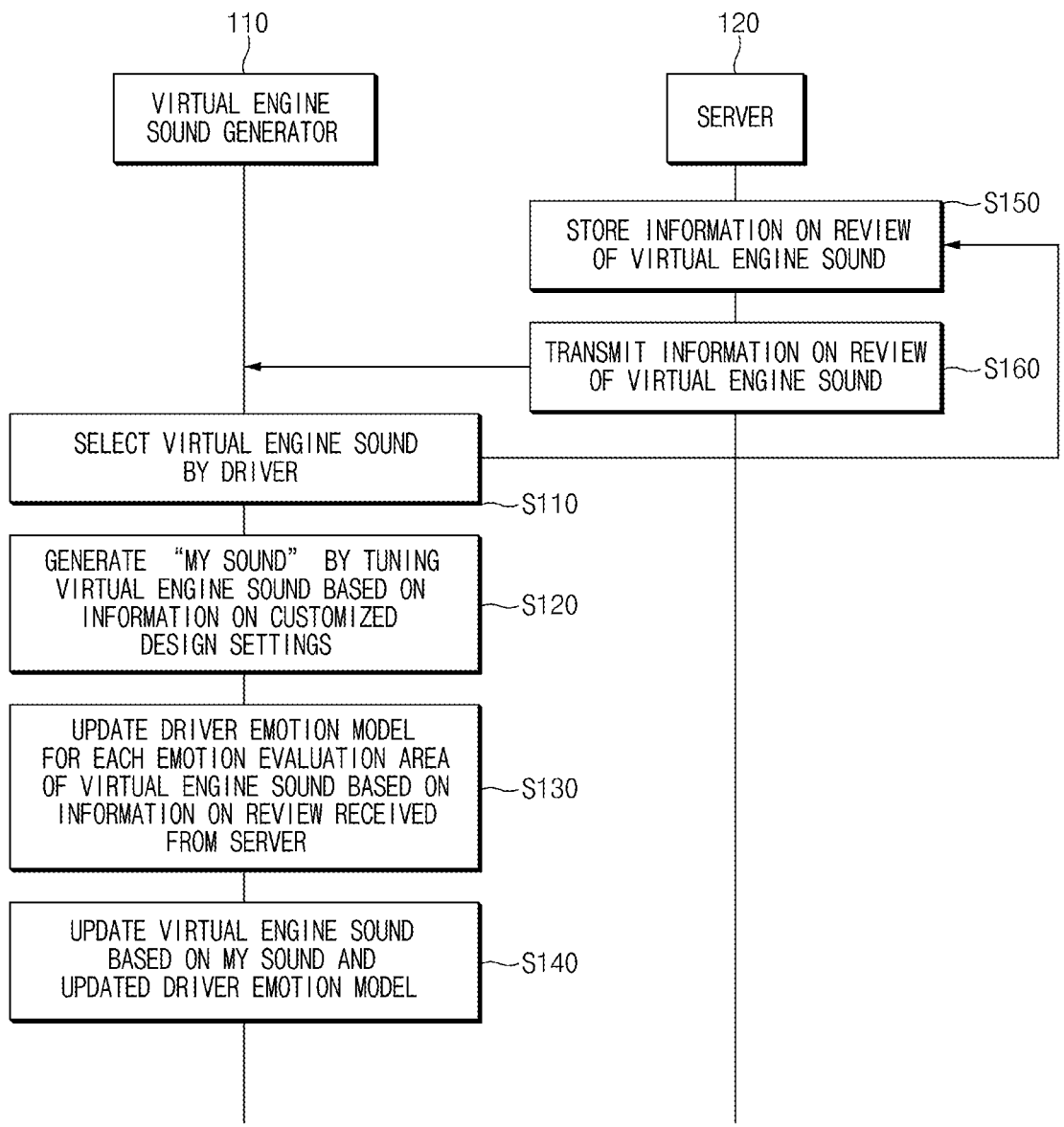
FIG. 6 is a flowchart illustrating a method for generating a virtual engine sound, according to various exemplary embodiments of the present invention.

FIG. 6 is a flowchart illustrating a method for generating a virtual engine sound, according to various exemplary embodiments of the present invention.

As illustrated in FIG. 6, the virtual engine sound generator 110 may transmit a selected virtual engine sound to the server 120, when selecting the virtual engine sound by the driver (S110). Furthermore, the virtual engine sound generator 110 may generate "my sound" by tuning the virtual engine sound based on information on the customized design settings (S120).

The virtual engine sound generator 110 may update a preset driver emotion model for each emotion evaluation area of the virtual engine sound, based on information on at least one review of the virtual engine sound, which is received from the server 120 (S130). The preset driver emotion model for each emotion evaluation area may be set based on at least one of a speed of the vehicle, an RPM of the vehicle, an opening amount of an accelerator pedal, or an acceleration in S130.

The virtual engine sound generator 110 may update the virtual engine sound selected in S110, based on the "my sound" generated in S110 and the driver emotion model updated in S130 (S140).

The server 150 may store information on the review of the virtual engine sound selected by the driver in S110 (S150). Furthermore, the server 150 may transmit the information on the review of the virtual engine sound to the virtual engine sound generator 110 (S160).

According to the system and the method for generating the virtual engine sound of the vehicle, the virtual engine sound customized for the vehicle user and having the latest trend may be generated such that the satisfaction of the user is improved.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for generating a virtual engine sound of a vehicle, the system comprising:
    a server configured to store information on at least one review of the virtual engine sound; and
    a virtual engine sound generator configured to:
    generate "my sound" by tuning the virtual engine sound, according to information on customized design settings;
    update a preset driver emotion model for each emotion evaluation area of the virtual engine sound, according to the information on the at least one review of the virtual engine sound, which is received from the server; and
    update the virtual engine sound based on the "my sound" and the preset driver emotion model updated for the emotion evaluation area.

2. The system of claim 1, wherein the virtual engine sound generator is configured to generate the information on the customized design settings, based on a mode, a sound volume, and a tone of the virtual engine sound, and a reaction degree resulting from depressing of an accelerator pedal of the vehicle.

3. The system of claim 1, wherein the virtual engine sound generator further includes:
    an interface to output an image for adjusting a mode, a sound volume, and a tone of the virtual engine sound, and a reaction degree resulting from depressing of an accelerator pedal of the vehicle.

4. The system of claim 1, wherein the emotion evaluation area includes:
    at least one of "Idle Volume", "Engine Main", "Dynamics", "Rumble", or "Whine".

5. The system of claim 1, wherein the virtual engine sound generator is configured to set the driver emotion model for the emotion evaluation area, according to at least one of a speed of the vehicle, revolutions per minute (RPM) of the vehicle, an opening amount of an accelerator pedal of the vehicle, or an acceleration of the vehicle.

6. The system of claim 1, wherein the virtual engine sound generator is configured to extract a keyword from the information on the at least one review and to update the preset driver emotion model for the emotion evaluation area of the virtual engine sound, based on the extracted keyword.

7. A system for generating a virtual engine sound of a vehicle, the system comprising: a virtual engine sound generator configured to: generate "my sound" by tuning the virtual engine sound, according to information on customized design settings; update a preset driver emotion model for each emotion evaluation area of the virtual engine sound, according to information on at least one review of the virtual engine sound; and update the virtual engine sound based on the "my sound" and the preset driver emotion model updated for the emotion evaluation area, an output device electrically connected to the virtual engine sound generator and configured for outputting the updated virtual engine sound, wherein the virtual engine sound generator includes an interface to output an image for adjusting a mode, a sound volume, and a tone of the virtual engine sound, and a reaction degree resulting from depressing of an accelerator pedal of the vehicle, and wherein the virtual engine sound generator is configured to generate the information on the customized design settings, based on the mode, the sound volume, and the tone of the virtual engine sound, and the reaction degree resulting from depressing of the accelerator pedal of the vehicle.

8. The system of claim 7, wherein the virtual engine sound generator is configured to set the driver emotion model for the emotion evaluation area, according to at least one of a speed of the vehicle, revolutions per minute (RPM) of the vehicle, an opening amount of the accelerator pedal of the vehicle, or an acceleration of the vehicle.

9. The system of claim 7, wherein the virtual engine sound generator is configured to extract a keyword from the information on the at least one review and to update the preset driver emotion model for the emotion evaluation area of the virtual engine sound, based on the extracted keyword.

10. The system of claim 7, further including: a server configured to store the information on the at least one review of the virtual engine sound, wherein the virtual engine sound generator is configured for updating the preset driver emotion model for each emotion evaluation area of the virtual engine sound, according to the information on the at least one review of the virtual engine sound, which is received from the server.

11. A method of generating a virtual engine sound of a vehicle, the method comprising:
generating, by a virtual engine sound generator, "my sound" by tuning the virtual engine sound, according to information on customized design settings;
updating, by the virtual engine sound generator, a preset driver emotion model for each emotion evaluation area of the virtual engine sound, according to information on at least one review of the virtual engine sound; and
updating, by the virtual engine sound generator, the virtual engine sound, based on the "my sound" and the preset driver emotion model updated for the emotion evaluation area.

12. The method of claim 11, wherein the generating of the "my sound" includes:
generating information on the customized design settings according to at least one setting value for a mode of the virtual engine sound, a sound volume of the virtual engine sound, and a tone of the virtual engine sound, or a reaction degree resulting from depressing of an accelerator pedal of the vehicle.

13. The method of claim 11, wherein the generating of the "my sound" includes:
tuning the virtual engine sound by adjusting a mode of the virtual engine sound, a sound volume of the virtual engine sound, a tone of the virtual engine sound, and a reaction degree of an accelerator pedal through an interface of the virtual engine sound generator.

14. The method of claim 11, wherein the emotion evaluation area include:
at least one of "Idle Volume", "Engine Main", "Dynamics", "Rumble", or "Whine".

15. The method of claim 11, wherein the updating of the preset driver emotion model includes:
setting the driver emotion model for the emotion evaluation area, according to at least one of a speed of the vehicle, an RPM of the vehicle, an opening amount of an accelerator pedal of the vehicle, or an acceleration of the vehicle.

16. The method of claim 11, wherein the updating of the preset driver emotion model includes:
extracting a keyword from the information on the at least one review; and
updating the preset driver emotion model for the emotion evaluation area of the virtual engine sound, based on the extracted keyword.

17. The method of claim 11, further including:
transmitting, by the virtual engine sound generator, a selected virtual engine sound to a server, when the virtual engine sound generator determines that the virtual engine sound is selected by a driver; and
storing, by the server, the information on the at least one review of the virtual engine sound selected by the driver; and
transmitting, by the server, the information on the review of the virtual engine sound to the virtual engine sound generator.

18. The method of claim 17, wherein the updating, by the virtual engine sound generator, a preset driver emotion model for each emotion evaluation area of the virtual engine sound, includes:
updating the preset driver emotion model for each emotion evaluation area of the virtual engine sound, according to the information on the at least one review of the virtual engine sound, which is received from the server.

* * * * *